Nov. 16, 1943.　　　F. M. CURTY　　　2,334,387
CHILD'S TRAILER
Filed March 2, 1942　　　2 Sheets-Sheet 1

Inventor
Frank M. Curty,
By McMorrow & Berman
Attorneys

Nov. 16, 1943.  F. M. CURTY  2,334,387
CHILD'S TRAILER
Filed March 2, 1942  2 Sheets-Sheet 2

Inventor
Frank M. Curty,

By McMorrow & Berman
Attorneys

Patented Nov. 16, 1943

2,334,387

UNITED STATES PATENT OFFICE 2,334,387

CHILD'S TRAILER

Frank M. Curty, Farmington, Iowa

Application March 2, 1942, Serial No. 433,059

1 Claim. (Cl. 280—204)

This invention relates to a child's trailer, and has for the primary object the provision of a device of this character which may be easily and quickly adapted to a tricycle or similar device whereby a child operating the tricycle can take another child for a ride with a maximum amount of safety, thus permitting a child of an advanced age while taking care of a younger child to have pleasant and healthy exercise along with amusement while the younger child will be kept amused by being taken riding.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation, partly in section, illustrating a child's trailer constructed in accordance with my invention, and showing the same attached to a fragmentary portion of a tricycle.

Figure 1:
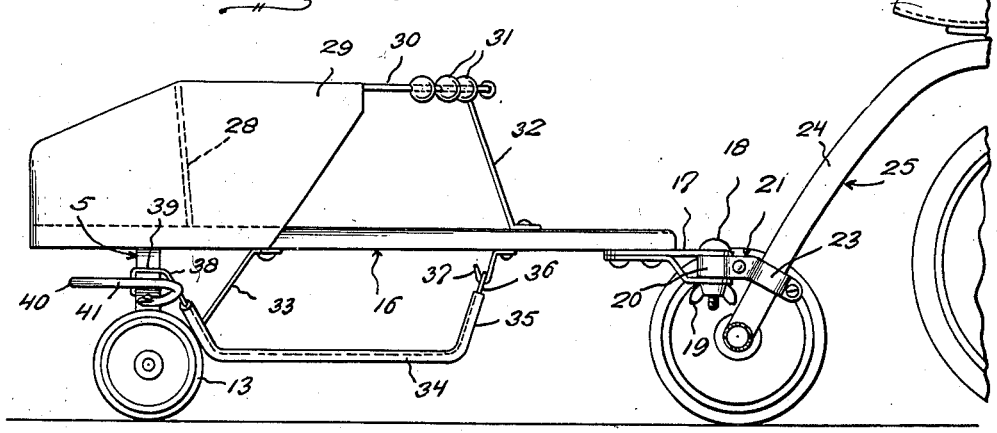
Figure 2:
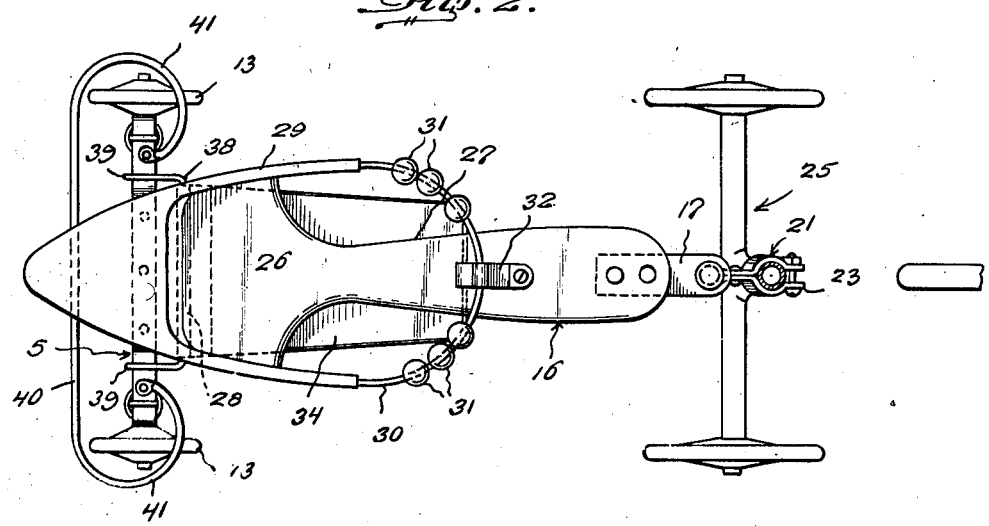
Figure 2 is a top plan view partly in section illustrating the trailer and a portion of the tricycle.
Figure 6:
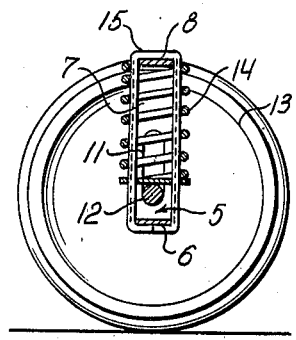
Figure 6 is a sectional view taken on the line 6—6 of Figure 3.
Figure 3:
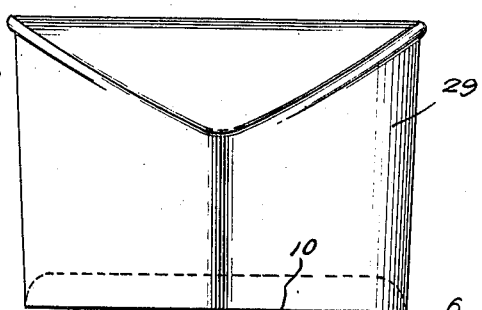
Figure 3 is a rear elevation illustrating the trailer.
Figure 4:
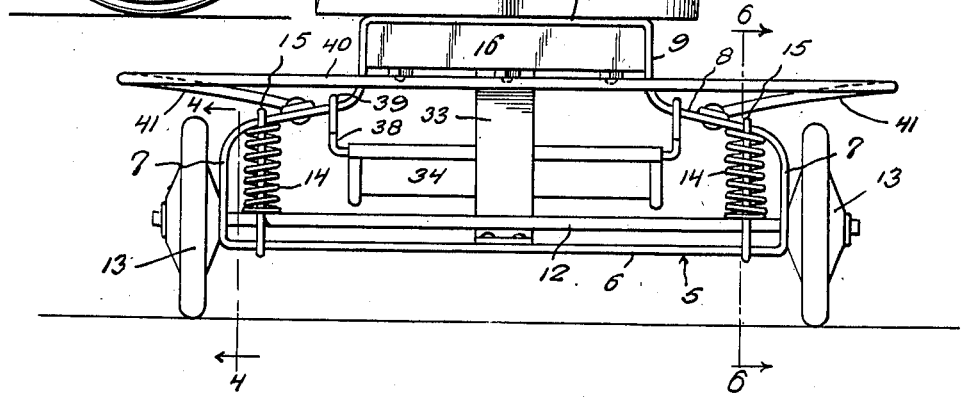
Figure 4 is a detail sectional view taken on the line 4—4 of Figure 3.
Figure 4:
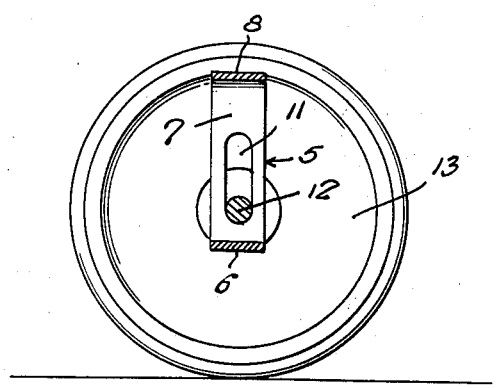
Figure 5:
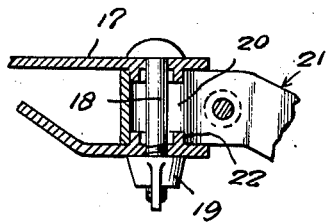
Figure 5 is a detail sectional view illustrating a coupler employed for connecting the trailer to the tricycle.

Referring in detail to the drawings, the numeral 5 indicates a frame, consisting of a cross member 6 having integral with its ends thereof vertically arranged portions 7 bent to converge, as shown at 8, and terminate in parallel vertically arranged portions 9 connected integrally together by a cross member 10. This construction of frame permits the latter to be made from a single piece of material and the vertical members 7 have slots 11 through which an axle 12 extends freely. Ground wheels 13 are journaled on the axle.

Cushioning springs 14 of the coil type are interposed between the axle 12 and the converging portions 8 of the frame. The cushioning springs 14 surround yokes 15 which pass about the cross member 6 and the converging portions 8 of the frame. The yokes 15 may be welded or otherwise secured to said portions of the frame.

Thus it will be seen that the frame 5 is cushioningly mounted on the axle to absorb road shocks.

The cross member 10 has secured thereto a horizontally arranged platform 16, the forward end of which is equipped with clevis type plates 17. A pivot bolt 18 including a removable nut 19 extends through the clevis plates and through a collar or bearing 20 of a coupler 21. Annular flanges 22 are formed on the opposing faces of the clevis plates 17 and are received within the coupler or bearing portion 20 thereof. The coupler 21 further includes a split type clamp 23 which may be readily adapted to a post 24 of a tricycle or similar device 25. The coupler and the clevis plates besides detachably connecting the trailer to the tricycle, will permit the trailer to readily pivot and swing relative to the tricycle.

The platform 16 is shaped to form a seat 26 and is also cut-away, as shown at 27, to permit a child's legs while seated on the seat to depend downwardly at opposite sides of the platform. A back rest 28 is secured on the seat of the platform and also secured on the rear portion of the platform and extending about each side of the seat is a sheet metal member 29 forming sides for the seat and also a compartment rearwardly of the back rest 28. An arcuately curved member 30 is connected to opposite sides of the sheet member 29 and extends forwardly thereof to provide a hand rail on which may be slidably mounted spherical elements 31 which the child occupying the seat may play with.

A brace 32 extends from the rod 30 to the platform. Also a brace 33 extends from the platform to the cross member 6.

A foot rest 34 underlies the cutaway portion 27 of the platform on which the feet of the child occupying the seat may rest. The foot rest 34 is constructed of sheet metal having upwardly extending portions 35, one of which is provided with an eye 36 to engage a hook 37 secured to the lower surface of the platform. The other end of portion 35 has connected thereto a rod 38, the ends of which are bent to form hooks 39 that engage the converging portions 8 of the frame.

A cross bar 40 is arranged under the rear portion of the platform and is provided with curved end portions 41, the ends of which are secured on the converging portions 8 of the frame 5. The curved portions 41 overlie the wheels and act as guards therefor and also as steps which a child may use in entering and leaving the seat.

While I have shown and described the connection of this trailer to a tricycle, it is to be understood that it may also be connected to a bicycle by employing another form of coupler, or if desired, may be connected to some other child-propelled device.

While I have shown and described the preferred embodiment of my invention, it will be understood that minor changes in construction, combination and arrangement of parts may be made without departing from the spirit and scope of the invention as claimed.

Having thus described my invention, what I claim is:

In a child's two wheel trailer, a frame including superimposed horizontal members and vertical members having vertical slots integral with the lower horizontal member and converging members connecting the vertical members to the upper horizontal member, an axle extending through the slots above and parallel to the lower horizontal member, a pair of wheels journaled on the axle outwardly of the vertical members, coil springs interposed between the axle and the converging members, yokes extending through the springs and straddling the axle and extending under the lower horizontal member and over and secured to the converging members, and a seat structure secured at one end to the upper horizontal member.

FRANK M. CURTY.